March 22, 1966     R. NOUEL     3,241,187
HYDRO-MECHANICAL CLAMPS

Filed Feb. 13, 1962     4 Sheets-Sheet 1

INVENTOR
ROBERT NOUEL

BY *(signature)*

ATTORNEY

March 22, 1966  R. NOUEL  3,241,187
HYDRO-MECHANICAL CLAMPS
Filed Feb. 13, 1962  4 Sheets-Sheet 2

INVENTOR
ROBERT NOUEL
BY
ATTORNEY

INVENTOR
ROBERT NOUEL
BY
ATTORNEY

March 22, 1966 R. NOUEL 3,241,187
HYDRO-MECHANICAL CLAMPS
Filed Feb. 13, 1962 4 Sheets-Sheet 4

INVENTOR
ROBERT NOUEL
BY
ATTORNEY

United States Patent Office 3,241,187
Patented Mar. 22, 1966

3,241,187
HYDRO-MECHANICAL CLAMPS
Robert Nouel, Villejuif, Seine, France, assignor, by mesne assignments, to Inventions Finance Corporation, New York, N.Y., a corporation of Delaware
Filed Feb. 13, 1962, Ser. No. 173,103
22 Claims. (Cl. 18—16)

The present invention relates to very powerful blocking devices known as hydro-mechanical multiplier clamps acting as pressure-jaws with a blocking function, the said devices being characterized by very low power consumption and being intended for mounting on any press, mold, tool or mechanism employed in the molding of plastics and also in the formation of aluminium or the like, for the purpose of maintaining closed two parts or members of a molding machine, said parts being subjected to pressure tending to separate them.

An essential characteristic feature of the invention comprises the forward movement of a multiplier lever and its associated member constituting the pressure-jaws, underneath the part to be blocked by means of a distributor slide-valve device which renders the apparatus completely automatic. This forward movement underneath the part to be blocked involves a consumption of energy which is practically negligible in view of the extremely small angular travel of the multiplier lever.

For the purposes of the present application, the use of the said pressure-jaw device is limited to plastic injection molding machines of the so-called "universal thrust" type as described in my previous applications, and also to the double injection press of the type illustrated in FIGS. 6 and 7 of the drawings accompanying the present specification.

In both cases, the useful power of the machines equipped with the pressure-jaws according to the invention will be increased in a very high proportion, especially when the two automatic regulation devices described in my co-pending applications are employed on the same machine. At the same time, the maximum surface area of the molded articles is also increased in a corresponding proportion. The pressure-jaws may however be operated alone and without using one or both the above-mentioned regulation devices, if so desired.

A further object and advantage of the present invention resides in the fact that not only can the pressure-jaws replace the pressure section and controls of the press, but also in the case of the double plastic injection machine shown in FIGS. 6 and 7, the entire pressure group or section of that machine may be eliminated as hereinafter described, resulting in a great economy in the cost of the machine, a very substantial saving in the production cost of the molded article, a very high degree of quality in the product, and a most efficient performance of the entire operation.

The characteristic features and the method of operation of the hydro-mechanical clamps or pressure-jaw devices according to the invention will be more clearly understood from the description which follows below, reference being made to the accompanying drawings which illustrate, by way of example only, one form of embodiment of the invention.

Figure 1:
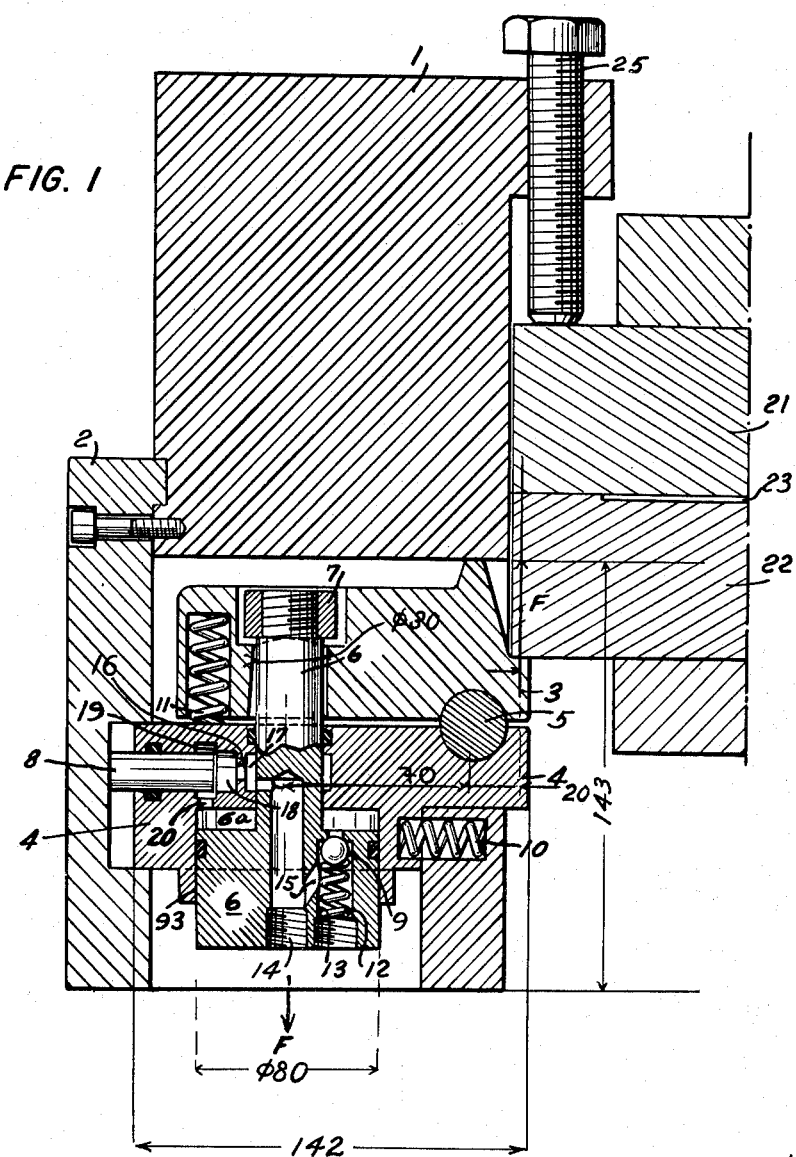
FIG. 1 is a vertical section through the left-hand portion of a molding press modified in accordance with the invention.

Referring now to FIG. 1, the clamp assembly is composed of support means including block 1 and 2, in which the hydraulic pressure-jaws are arranged to slide within a recess, this block 1 being adapted to resist the tractive force produced by the multiplier clamp unit. The multiplier clamp further comprises a moving slide 4 of a multiplier lever 3 adapted to pivot on a shaft 5. The multiplier lever 3 is pulled downwards by the action of a hydraulic jack 6, the tractive effort of which is transmitted to the lever 3 by a nut 7.

A distributor piston 8 actuates the displacement of the slide 4 and at the same time compresses a spring 10, the expansion of which operates the return movement of the slide.

The height at which the lower portion of the mold is blocked by the pressure-jaws can be regulated by means of the upper screw 25.

The hydraulic distribution is effected by an inlet 14, a ball or non-return valve 9 preventing the passage of the fluid from 14 towards the traction chamber 6a, but permitting the fluid to pass from the said chamber towards the inlet 14. A passage 16 leads the fluid into a groove 17, and an orifice 18 brings the fluid into contact with the distributor piston 8. The forward movement of the distributor piston allows the fluid to pass into the groove 19, and finally an orifice 20 permits the passage of the fluid into the traction chamber 6a of the jack 6.

OPERATION—CLOSURE, BLOCKING ACTION

The operation is very simple. The application of fluid pressure causes the forward movement and the automatic closure of the hydraulic clamp or pressure-jaw. The removal of the fluid pressure causes the reverse action to take place, namely the opening and the return movement of the clamp or pressure-jaw.

The fluid under pressure arriving at 14 from a suitable source is prevented from passing into the traction chamber 6a directly by the non-return ball-valve 9. It passes through the conduit 16 and thence into the groove 17, after which it comes into contact with the distributor piston 8 through the orifice 18. The fluid pressure displaces the distributor piston which causes the multiplier clamp unit to move forward, compresses the spring 10, and this action ceases when the multiplier jaw is located underneath the portion to be blocked. At that moment, the pressure fluid passes into the groove 19 and then penetrates through the orifice 20 into the traction chamber 6a of the jack 6. The latter pulls down and causes the multiplier lever to pivot while compressing the spring 11, after which it rigidly blocks the tools 21 and 22 of the press or other device. FIG. 1 shows the unit in this blocked position.

RELEASE AND RETURN

When the fluid pressure is removed, the traction chamber 6a no longer urges the jack 6 downwards, the spring 11 expands and opens the multiplier jaws, at the same time causing the fluid to be evacuated at 13 through the ball or non-return valve 9. Furthermore, as the pressure is also removed from the distributor piston 8, the spring 10 is also freed to expand and thus causes the return of the mutiplier jaw unit. The fluid is evacuated by the path 18–17–16 towards 14. The release and return actions are thus completed.

Figure 2:
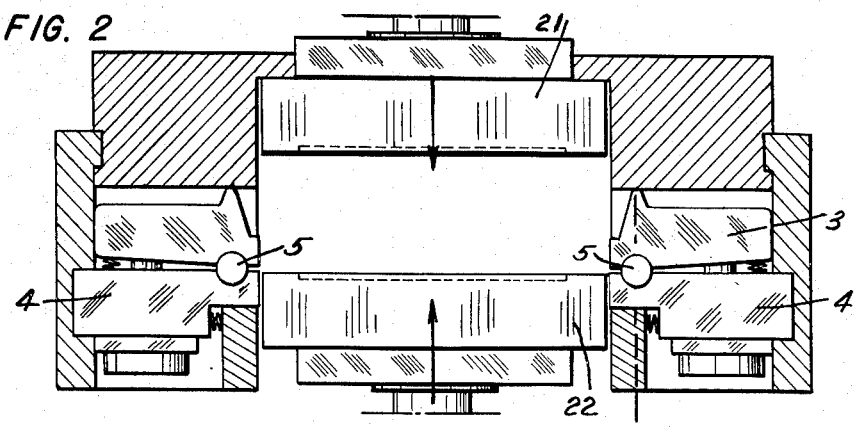
FIGS. 2, 3 and 4 are diagrammatic sections of a press, showing the action of the hydro-mechanical pressure-jaw devices in the open, closed and pressure-application phases respectively of a molding operation.
Figure 3:
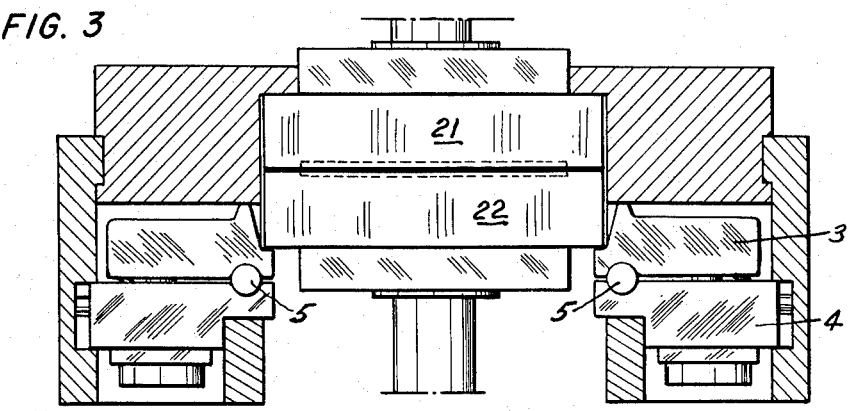
Figure 4:
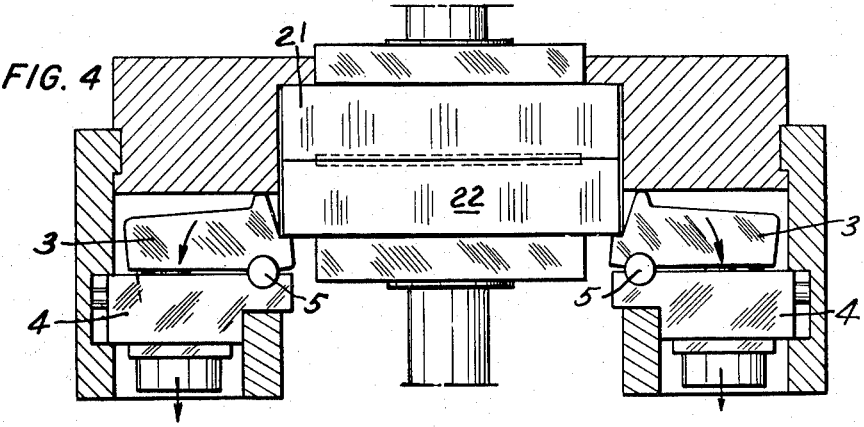

The diagrammatic arrangements shown in FIGS. 2, 3 and 4 clearly illustrate the action of the hydro-mechanical clamps 3 and 4 during three phases of the operation of the tools 21 and 22.

In FIG. 2, the two pairs of clamps 3 and 4 are in their retracted positions at rest, and the upward passage of the tool 22 is unhindered. At the moment when the tools 21 and 22 come into contact, the hydraulic pressure is applied to actuate the clamps as previously described, and the units 3 and 4 are displaced inwards so that the projecting shoulders on the inner faces of the multiplier levers 3 engage the lower corners of the tool 22. This is the closure phase.

The hydraulic jack 6 is then operated so as to cause the multiplier levers 3 to pivot anti-clockwise about the shafts 5. Owing to the very considerable mechanical advantage of the levers 3, this comparatively small pivotal movement applies an extremely powerful upward pressure to the tool 22 against the tool 21, and this completes the pressure-application phase of the press.

Figure 5:
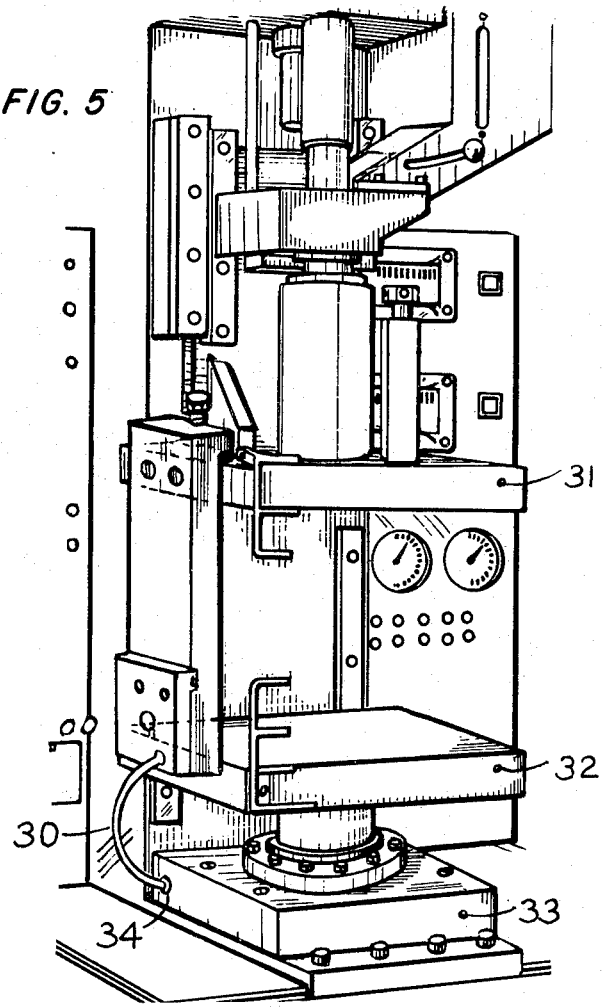
FIG. 5 is a perspective view of a molding press modified by the addition of hydraulically-operated mechanical clamps or pressure-jaws.

In the diagrammatic view of the molding press shown in FIG. 5, the two plates 31 and 32 of the press are blocked by the hydraulically-operated clamps, as previously described with reference to FIGS. 1 to 4. On the lower jack plate 33 of the press there are provided two hydraulic pressure tappings, one on each side of the plate, of which one only, 34, has been shown on FIG. 5. The hydraulic connections are effected by two flexible pipes, of which only one, 30, has been shown in order to simplify the drawing. The two hydraulic pressure tappings 34 communicate with the central injection cylinder. The pressure in this injection cylinder only exists at the moment of the injection. The two hydraulically operated clamps will only be closed at injection, that is to say with the mold closed and the plates 31 and 32 brought close together. In order to open the clamps or jaws, the hydraulic pressure in the central cylinder falling to zero on the return causes the inverse operation, that is to say the opening and the lateral return movement of the two pairs of clamps 3 and 4. A very simple and effective automatic operation is thus obtained.

ADVANTAGES OF THE MAIN FEATURE

It should be observed that if there is no forward movement of the clamp units to permit the escape of the multiplier lever 3, it would be necessary to increase the diameter of the shaft 5. Such an increase would result in the whole assembly being practically doubled in overall size. It will also be seen that, for the same ratio, the piston 6 will have twice the travel, assuming a small pivotal movement. This condition would be impossible, it would be at least between 5 and 10 times the presently provided angular pivotal movement. The ratio of energy consumption would therefore be:

$$2 \times 5 = 10 \text{ minimum}; 2 \times 10 = 20 \text{ normal}$$

In the case of the hydraulic press 40, the travel of the piston 6, being about 5 mm., would pass in a conventional pivotal movement without advance, between $5 \times 10 = 50$ mm. and $5 \times 20 = 100$ mm.

It can be seen immediately that a travel of this length would be necessary. The overall size increases to a considerable proportions, and furthermore the system of transmission of the tractive effort by a single nut 7 becomes impossible. A more complicated mechanism would be necessary. The overall size increases to a very considerable extent.

A further advantage resides in the safety provided by the forward movement. If, for any reason, the jaws closed before the part to be blocked, if the clamp unit came into contact with the mold or the plate of the press, the forward movement of the jaws not taking place, the distributor piston 8 would prevent the operation of the piston 6. In the conventional case without forward movement, the upper jaw would pivot immediately and would probably cause irreparable damage.

From the preceding discussion of the principal feature of the invention, the following results become apparent:

(1) The machine modified according to the invention is of very small overall size.

(2) The machine has a very high power/weight ratio.

(3) It also has an extremely small power consumption, from ten to twenty times less than with a conventional type of pivoted device.

(4) The consumption of hydraulic energy for the device is also extremely low.

(5) In consequence of the low consumption of energy, the response of the device is instantaneous.

(6) The degree of safety is very high. The pressure jaws can only pivot when the clamp is in its blocking position.

PRACTICAL EXAMPLE

The following practical illustrations of the above analyses are given for a hydraulic clamping unit working on a hydraulic pressure of 300 kg./sq. cm.

(1) The general overall dimensions of the clamping unit are 100 mm. x 142 mm. x 143 mm.

(2) High power/weight ratio (weight of the clamp unit=11 kg.). From the relation $70 \times f = 20 \times F$ we have $F = 3.5f$ where $f = $ (section $\phi 80$ — section $\phi 30$) $\times 300$ kg./sq. cm. $= 13$ tons
$F = 13 \times 3.5 = 45.5$ tons
The power/weight ratio $= 45.5/11$ kg. $= 4.13$ tons per kg. or 0.242 kg. per ton.

The result of this very high power/weight ratio is that for example a clamp unit having a power of 1,000 tons would have in practice a maximum weight of 242 kg.

(3) Mechanical energy consumed:

$$13,00 \text{ kg.} \times 0.005 \text{ m.} = 65 \text{ kg./metre}$$

It should be noted that this energy corresponds to that absorbed by an accumulator. A pump would consume less than half since the effort takes place only at the end of the stroke (about 2 mm.).

(4) Hydraulic consumption:

Volume of oil=(section $\phi 80$—section $\phi 30$)$\times$stroke (5 mm.)+volume of distributor piston=24.5 cu. cm. at a pressure of 300 kg./sq. cm.

(5) Instantaneous response:

In the case of the press hydro 40, it is necessary to provide two hydro-mechanical clamps. These are mounted on each side of the press plates and block the latter simultaneously.

The pump of the hydraulic press 40 delivers 200 cu. cm. of oil per second at a pressure of 300 kg./sq. cm.

The theoretical closure time of this pair of pressure-jaws developing $45.5 \times 2 = 91$ tons, is:

$$\frac{24.5 \text{ cu. cm.} \times 2}{200} = \frac{49}{200}$$

or about 0.25 second.

PRACTICAL ADVANTAGE ON THE HYDRAULIC PRESS 40

As the pair of pressure jaws develops 91 tons, the clamping effect on the molds is increased to 91 tons+40 tons (power of press) or 131 tons total.

The clamping power applied to the molds has therefore increased in the proportion of $131/40 = 3.27$.

The molding surface area will be increased by exactly the same proportion, namely:

Surface molding area of the press=surface area of injection piston (neglecting the pressure losses)=45 sq. cm. We therefore obtain for the augmented molding surface area:

$$45 \text{ sq. cm.} \times 3.27 = 146.15 \text{ sq. cm.}$$

Furthermore, if we utilize the regulator or regulating nozzle, the molding surface area will be increased to:

$$146.5 \text{ sq. cm.} \times 7.6 = 1110.75 \text{ sq. cm.}$$

Figure 7:
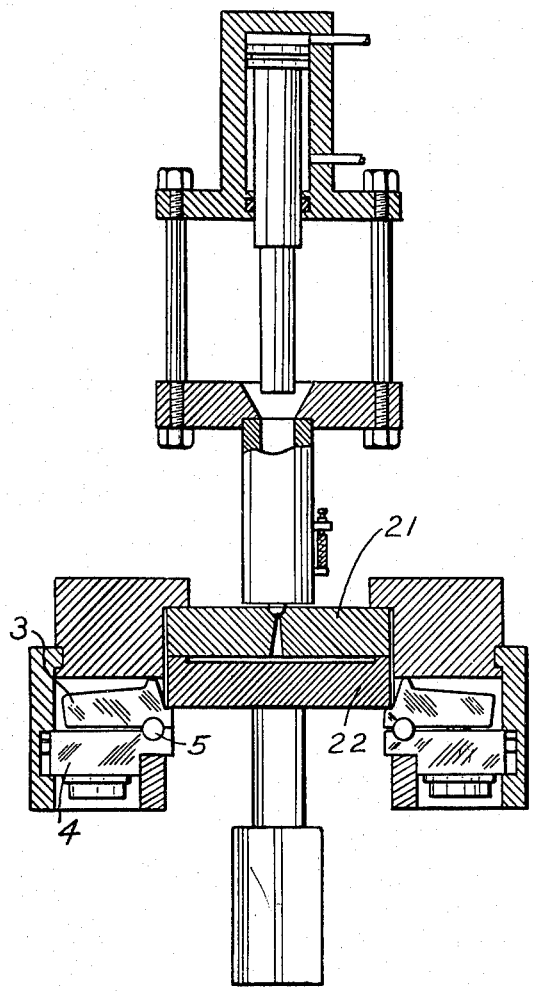
FIGS. 6 and 7 show the application of the invention to a standard double molding press shown for purposes of comparison in its unmodified form (FIG. 6) and as modified by the addition of hydrauilcally-operated pressure-jaws (FIG. 7).
Figure 6:
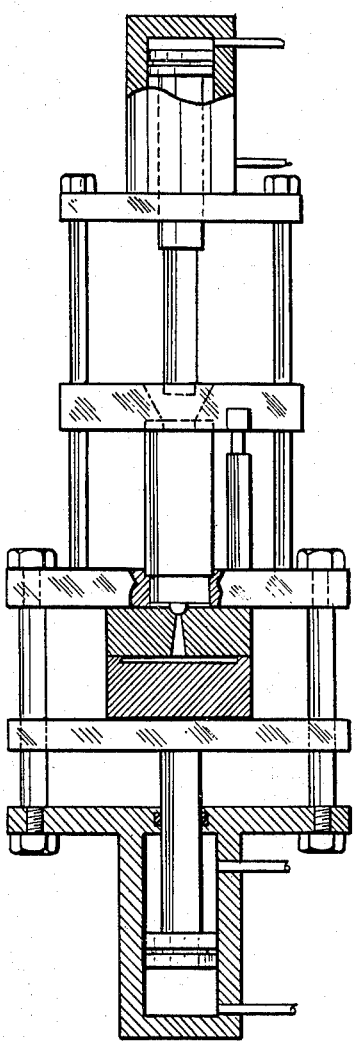

The advantages obtained by the application of the hydro mechanical clamps according to the present invention are much greater when the clamps are used on double injection presses. In FIG. 6, there is shown a diagrammatic representation of a standard double molding press, and in FIG. 7 the same press is shown with the modification introduced by the mounting of the hydro-mechanical clamps.

In the case of the injection molding press having separate injection and closure, the press is composed broadly of two sections:

(1) The injection section:

This portion serves exclusively for the plastification and the introduction under pressure of the plastified material into the mold;

(2) Pressure or closure section:

This section enables the tools to be held closed against the internal forces applied by the instroduction of the material under pressure into the mold.

It has been found as a surprising and unexpected result of the invention and which constitutes an important advantage, that the use of the hydro-mechanical clamps permits the above pressure section to be entirely eliminated.

Further important advantages result from this possibility:

(1) The large and costly pressure section is dispensed with and is replaced by a number of hydro-mechanical clamps having a low production cost.

(2) The power of the pressure section of the press is variable, according to the number of clamps employed.

(3) The stroke or travel of the press, which normally limits the maximum height of the molded artcile, has no longer any effect since the opening travel is a function of the means employed for driving the press to the closed position.

(4) The dimensions of the molds are no longer a function of the sizes of the plates 3 or of the distance between centers of the columns 4. Furthermore, the power required is variable, depending on the number of clamps and the power of the said clamps.

(5) Apart from essential requirements of the molding operation, the design of the mold does not need to take account of other conditions such as ejection, centering of the mold, fixing, etc.

(6) The molding of very large articles need not await any longer the construction of a press of the size capable of its execution.

What I claim is:

1. Apparatus for clamping two bodies comprising support means providing an abutment for one body and a free path for movement of another body against said one body; a force applying means movable into said free path from a position lateral thereof for engaging said other body; and means for sequentially moving said force applying means into said free path and for producing a force through said force applying means to said other body to force it against said one body and said abutment.

2. Apparatus for clamping two bodies comprising a support means providing an abutment engaging one of said bodies and a free path for movement of the other body into engagement with said one body; a force applying means movable laterally of said path from a point removed from said path to a point in said path for engagement with said other body; and means carried by said force applying means for creating a force on said force applying means to clamp said other body against said one body and said abutment.

3. Apparatus for clamping two bodies comprising support means providing an abutment for one of said bodies and a free path for movement of the other of said bodies; a force applying means movable between a first position outside said free path to a second position in said free path for engaging said other body; means for moving said force applying means between said two positions; and means operable upon movement of said force applying means to said second position within said free path for actuating said force applying means to cause it to engage said other body and to force said other body against said one body.

4. An apparatus for applying a force in a given direction to a structurally independent body, said apparatus comprising a support means defining body-engaging abutment means including a member movable transversely of the axis of said support means, lever means mounted on said transversely movable member for pivotal movement in the plane of the transverse movement of said movable member for exerting a closing multiplied force to said body-engaging abutment means greater than the force applied thereto, and means for applying an actuating force to said lever means to effect its pivotal movement in a direction parallel to but opposite that in which the force is transmitted to said body-engaging abutment means.

5. A clamping device slidable generally transversely to the direction of travel of two separable parts to be clamped between positions within and without the path of travel of said separable parts, comprising a base, a lever pivotally mounted on said base, power means between said base and said lever to pivot the latter to a pivotal position to thereby clamp said parts, positioning means on said base operable to react against a member fixed relative to said base to cause said base to move in said generally transverse direction between said positions within and without the path of travel of said parts, and means interposed between said power means and said positioning means arranged such that said power means is controlled by said positioning means.

6. In a clamping device operable to clamp two members and to permit separation of said members as relative movement is effected therebetween along a defined path of travel, comprising support means adjacent said two members, said support means being connected to one of said members, a force mutliplying means carried by said support means and movable to a clamping position in said path of travel and to a retracted position out of said path of travel, said force multiplying means comprising a pivotally mounted lever and power means for actuating said lever such that when said force multiplying means is in said clamping position, said power means rotates said lever by a force applied to an end portion thereof to exert a highly multiplied pivotal force against said members.

7. A force applying device for applying a compressive force to a body structurally independent thereof, comprising support means for said device, spaced first and second means of said support means defining a pair of abutment means, one of said abutment means being slidable toward and away from said body, said one abutment means comprising a pivotally mounted lever means, having an abutment element thereon, means exerting a force on said lever means to move said abutment element in a direction toward said other abutment means, and means within said lever means for applying an actuating force to said lever means in a direction away from said other abtument means to effect said movement of said abutment element towards said other abutment means.

8. Apparatus for clamping a body comprising support means providing an abutment and a free path normal to said abutment for movement of said body into engagement with said abutment, mounting means slidably supported on said support means for movement transversely of said path, lever means pivotally supported on said mounting means having a portion extending into said free path when said mounting means is at a position least remote from said free path for engaging said body, means within said mounting means for moving said mounting means from a position more remote to a position least remote from said free path, a force applying means also within said mounting means for applying a force on said lever to cause it to pivot into engagement with said body and to apply a force thereto, and means controlled by the movement of said mounting means into the position less remote from said path for energizing said force applying means.

9. Apparatus for clamping a body comprising support means providing an abutment, a free path normal to said abutment for movement of said body thereagainst and a reacting surface parallel to and spaced from said abutment and to one side of said free path, mounting means slidably supported on said reacting surface from a point more remote to a point less remote of said free path, lever means pivotally supported on said mounting means with one end projecting into said free path when said mounting means is in said less remote position for engaging said body, means for moving said mounting means from said position more remote to said position less remote of said free path, force applying means for pivotally actuating said lever into engagement with said body to force said body against said abutment, and means responsive to movement of said mounting means into said position less remote from said free path for actuating said force applying means.

10. Force-applying apparatus comprising a support means, said support means having first and second means thereon defining body-engaging devices spaced from each other and adapted for applying force therebetween, one of said devices comprising a base member movably mounted on said support means, lever means fulcrumed on said base member, one of said body-engaging devices being formed on one end of said lever means, power-actuted means in said movable base member for moving said base member into body-engaging position and including means secured to the opposite end of said lever means for moving said body-engaging devices into and out of force-applying engagement with the body.

11. A device as defined in claim 10 wherein said base member is transversely slidable between an inoperative and an operative force-applying position, said power-actuated means comprising inter-connected fluid pressure means responsive to a single source of pressure fluid to move said base member on said support means from an inoperative to an operative force-applying position and thereafter pivotally move said body-engaging device on said lever into pressure engagement with the body.

12. An arrangement for forcibly urging a plurality of parts together, comprising a hollow support having an opening therein beside said parts, a compound structure including a first means slidable bodily in said hollow support and partially out of said support opening, a force multiplying member pivoted between its ends on said first means, jaw means on said force multiplying member for clamping said parts together, and means for sequentially driving said first means partially outward of said support opening and pivoting said force multiplying member on said first means to engage said jaw means with one of said parts to forcibly urge and maintain said parts together.

13. In a molding press comprising first and second relatively reciprocal bodies for opening and closing a die cavity, fluid pressure means in the molding press for actuating said bodies, a device for securing said bodies fixed in relation to one another, said device comprising: support means juxtaposed to said bodies, an abutment at one end of said support means projecting into engagement with the first said body, a retractable member at the other end of said support means movable by said molding press fluid actuating means into and out of engagement with the said second body, and means for sequentially moving said member into engagement with said second said body and for producing a force through said member to said second body to force it against said first body and said abutment.

14. A device for maintaining a plurality of adjacent members of an apparatus subject to a separating pressure in engagement with each other along one axis, said device comprising, support means positioned laterally of said members and having a recess therein and adapted to be disposed adjacent to and extending below and above said members of the apparatus, said recess having an open side toward said axis slide means slidable in said recess and partially out the open side of said recess in said support means in a direction perpendicular to the direction of closure of said members of the apparatus, fulcrum means on said slide means adjacent one end thereof, a force multiplying lever fulcrumed on said fulcrum means having an end engageable with and exerting a closing force on said members of a multiplied value relative to the force applied to said lever, and means for exerting an applied force on said lever.

15. A device as claimed in claim 14 wherein said last mentioned means includes fluid pressure means carried by said slide means for sequentially moving said slide means in said recess in one direction and then exerting an applied force on said force multiplying lever to exert said closing force on said members, and means normally urging said slide means in an opposite direction and said force multiplying lever to a position free of engagement with said members of the apparatus.

16. A device for maintaining at least two parts of an apparatus subjected to an internal pressure in fixed relation to one another, said device comprising a support body positioned adjacent to and extending above one of said parts of said apparatus in engagement therewith and extending below the other part of said apparatus, said body having a recess therein, a pressure jaw unit slidably mounted in said recess and comprising a slide movable in a direction perpendicular to the direction of closure of said parts, a multiplier lever, a shaft fixed between said slide and said multiplier lever, said multiplier lever being carried on said slide and rotatably movable about said shaft, said slide being movable in and at least partially out of said recess in said support body, power means for moving said slide relative to said recess to a position where said lever is engageable with said first part outwardly of said recess when said parts are in juxtaposition, and for moving said lever about said shaft out of engagement with the other of said two parts, and means for normally urging and operative to move said slide inwardly of said recess in opposition to the movement thereof effected by said power means when the latter is inactive.

17. Clamping means comprising a support structure, first and second means carried by said support structure providing a pair of spaced jaws, one of said means comprising a clamping structure and including a base member, means carried by said base member defining a fulcrum, a lever supported on said fulcrum and having a clamping face on one end portion thereof, and means cooperating between said base member and said lever for applying a force to said lever at a location spaced further from said fulcrum than said clamping face and on the opposite side of said fulcrum from said clamping face, whereby to pivot said lever about said fulcrum and move said clamping face away from said base member and toward the other of said first and second means.

18. Clamping means as defined in claim 17 wherein said means cooperating between said base member and said lever comprises an actuating piston movable within said base member, a piston rod projecting from said piston said base member, and means on said piston rod engaging said lever to apply force thereto to effect the pivoting of said lever, means for normally urging said clamping structure to said retracted position and means for normally urging said lever in a direction to move said clamping face toward said base member.

19. In a molding press including first and second relatively reciprocal parts for opening and closing at least one die cavity therebetween, the combination of:
 (a) a support body extending laterally of and along the path of relative movement of said parts,
 (b) means on said body engagable with said first part,
 (c) clamping means comprising a first member laterally slidable on said body to move into and out of a projecting position behind said second part,
 (d) a second member comprising a lever fulcrumed on said first member and having means thereon disposed to forcibly engage said second part upon pivotal motion of said second member when said first member has moved to its projecting position, and
 (e) means for sequentially projecting said first member laterally on said body and thereupon pivoting said second member on its fulcrum to engage and forcibly lock said second reciprocal part in fixed relation to said first relatively reciprocal part.

20. In combination with an injection machine having separable engaging components, a clamping device for maintaining said components in engagement, said clamping device including a support means positioned to one side of said separable engaging components and having a recess therein, and means slidable in said recess transversely of said components, said means defining a clamping structure for maintaining said components in engaged relation, said clamping structure including lever means having a jaw thereon for exerting a force between the components engaged by said jaw greater than an external force applied to said lever means.

21. The combination defined in claim 20 wherein said device further includes first power operable means carried in said device thereof for exerting an externally applied force on said lever means, said means pivotally supporting said lever means thereon for movement between a retracted position within said recess and out of the path of movement of the component engageable thereby and a clamping position within the path of said component outwardly of said recess for engagement of said jaw with said component, and second power operable means carried in said device for moving said clamping structure between said retracted and clamping positions.

22. In combination with an injection molding machine having separable engaging components at least one of which is movable, a plurality of spaced apart clamping devices for maintaining said components in engagement, each said clamping device including a support means positioned laterally adjacent said machine and having a recess therein, and means within said recess defining a slidably mounted clamping unit adapted to engage said movable component, said last named means defining a clamping structure and including lever means having a jaw for exerting a force between the components maintained engaged by said jaw greater than an external force applied to said lever means.

References Cited by the Examiner
UNITED STATES PATENTS

| | | |
|---|---|---|
| 398,588 | 2/1889 | Downs. |
| 2,526,918 | 10/1950 | Wilberschied _____ 18—30 XR |
| 2,564,884 | 8/1951 | De Sternberg _____ 18—43 XR |
| 2,988,778 | 6/1961 | Chaze et al. _____ 18—30 |

J. SPENCER OVERHOLSER, *Primary Examiner.*
ROBERT F. WHITE, MICHAEL V. BRINDISI,
*Examiners.*